United States Patent [19]

Erickson et al.

[11] Patent Number: 5,513,815
[45] Date of Patent: May 7, 1996

[54] TAPE GUIDE MODULE FOR A DATA CARTRIDGE

[75] Inventors: Leif O. Erickson, River Falls, Wis.;
 Jay J. Ignaszewski, Woodbury, Minn.

[73] Assignee: Minnesota Mining and Manufacturing Company, St. Paul, Minn.

[21] Appl. No.: 266,007

[22] Filed: Jun. 27, 1994

Related U.S. Application Data

[63] Continuation-in-part of Ser. No. 86,322, Jul. 1, 1993, Pat. No. 5,377,927.

[51] Int. Cl.$^6$ ................................................ G11B 23/04
[52] U.S. Cl. ........................................................ 242/346
[58] Field of Search ........................ 242/346; 360/130.21; 226/97, 196

[56] References Cited

U.S. PATENT DOCUMENTS

| 3,588,346 | 6/1971 | Ramig, Jr. ................................. 178/42 |
| 3,692,255 | 9/1972 | Von Behren . | |
| 3,831,882 | 8/1974 | Fitterer et al. ........................... 226/196 |
| 3,984,039 | 10/1976 | Hawley et al. ............................ 226/97 |
| 3,991,956 | 11/1976 | Machida .................................. 226/196 |
| 4,305,536 | 12/1981 | Burdorf et al. .............................. 226/1 |
| 4,335,857 | 6/1982 | Pfost et al. ............................ 242/346.2 |
| 4,466,582 | 8/1984 | Shiba .................................... 242/346.2 |
| 4,491,891 | 1/1985 | Shiba .................................... 360/130.21 |
| 4,686,597 | 8/1987 | Johnston ............................... 360/130.23 |
| 4,736,904 | 4/1988 | Schoettle et al. . | |
| 4,754,908 | 7/1988 | Tanaka et al. . | |
| 5,104,058 | 4/1992 | Eggebeen . | |
| 5,157,833 | 10/1992 | Kohama et al. . | |
| 5,251,844 | 10/1993 | Albrecht et al. ......................... 226/198 |
| 5,289,331 | 2/1994 | Eaton et al. ........................... 360/130.21 |
| 5,297,755 | 3/1994 | Felde et al. . | |
| 5,316,235 | 5/1994 | East et al. ................................ 242/346 |
| 5,377,927 | 1/1995 | Erickson et al. ......................... 242/346 |

FOREIGN PATENT DOCUMENTS

| 0274197 | 7/1988 | European Pat. Off. . |
| 0536912 | 4/1993 | European Pat. Off. . |
| 2073142 | 10/1981 | United Kingdom . |
| WO92/15989 | 9/1992 | WIPO . |
| WO93/03484 | 2/1993 | WIPO . |

OTHER PUBLICATIONS

Hagopian, IBM Technical Disclosure Bulletin vol. 16, No. 12 May 1974.
Griffiths, IBM Technical Disclosure Bulletin vol. 15 No. 8 Jan. 1973.
Smith et al, IBM Technical Disclosure Bulletin vol. 26 No. 8 Jan. 1984.
Clegg et al, IBM Technical Disclosure Bulletin vol. 25 No. 2 Jul. 1982.
Bauman et al, IBM Technical Disclosure Bulletin vol. 24 No. 12 May 1982.
Curry et al, IBM Technical Disclosure Bulletin vol. 16 No. 12 May 1974.
DeLessio et al, IBM Technical Disclosure Bulletin vol. 34 No. 9 Feb. 1992.
IBM Technical Disclosure Bulletin vol. 29, No. 5 Oct. 1986.
Andresen et al, IBM Technical Disclosure Bulletin vol. 27 No. 7B Dec. 1984.
Wigutman, IBM Technical Disclosure Bulletin vol. 27 No. 6 Nov. 1984.

*Primary Examiner*—John P. Darling
*Attorney, Agent, or Firm*—Gary L. Griswold; Walter N. Kirn; Charles L. Dennis, II

[57] ABSTRACT

A tape guide module for a reel-to-reel data cartridge containing a pair of tape guides configured to provide a tape guide adjacent to each side of a read/write zone in the data cartridge. The tape surface pieces are formed as a type of leaf spring that are loaded when it is assembled between top and bottom plates. The top and bottom plates form at least one flange to guide and align the tape to improve tape tracking.

18 Claims, 10 Drawing Sheets

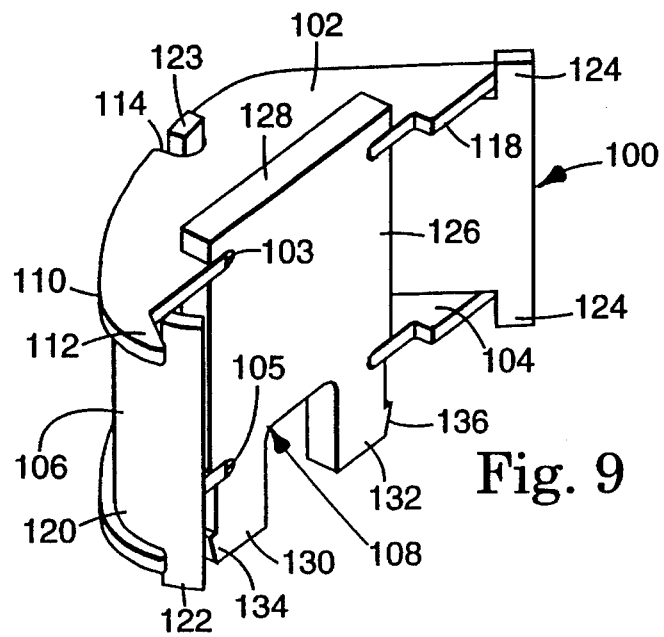
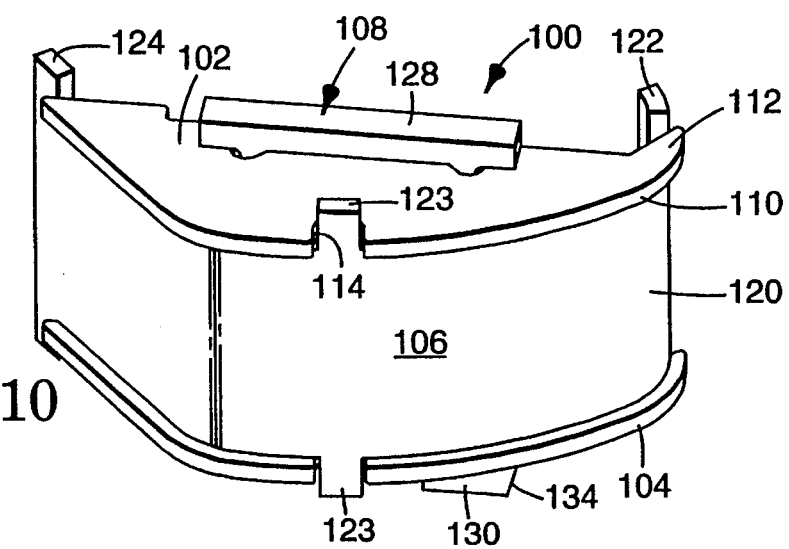
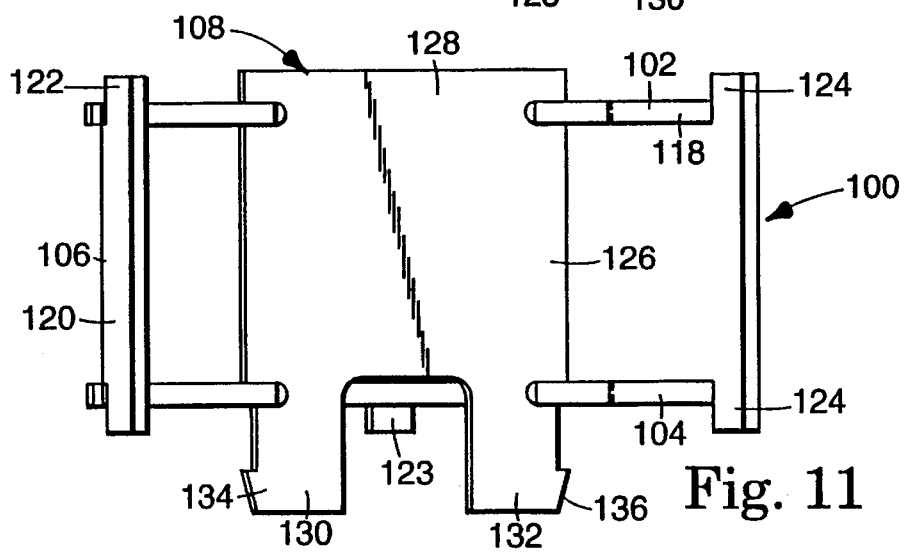

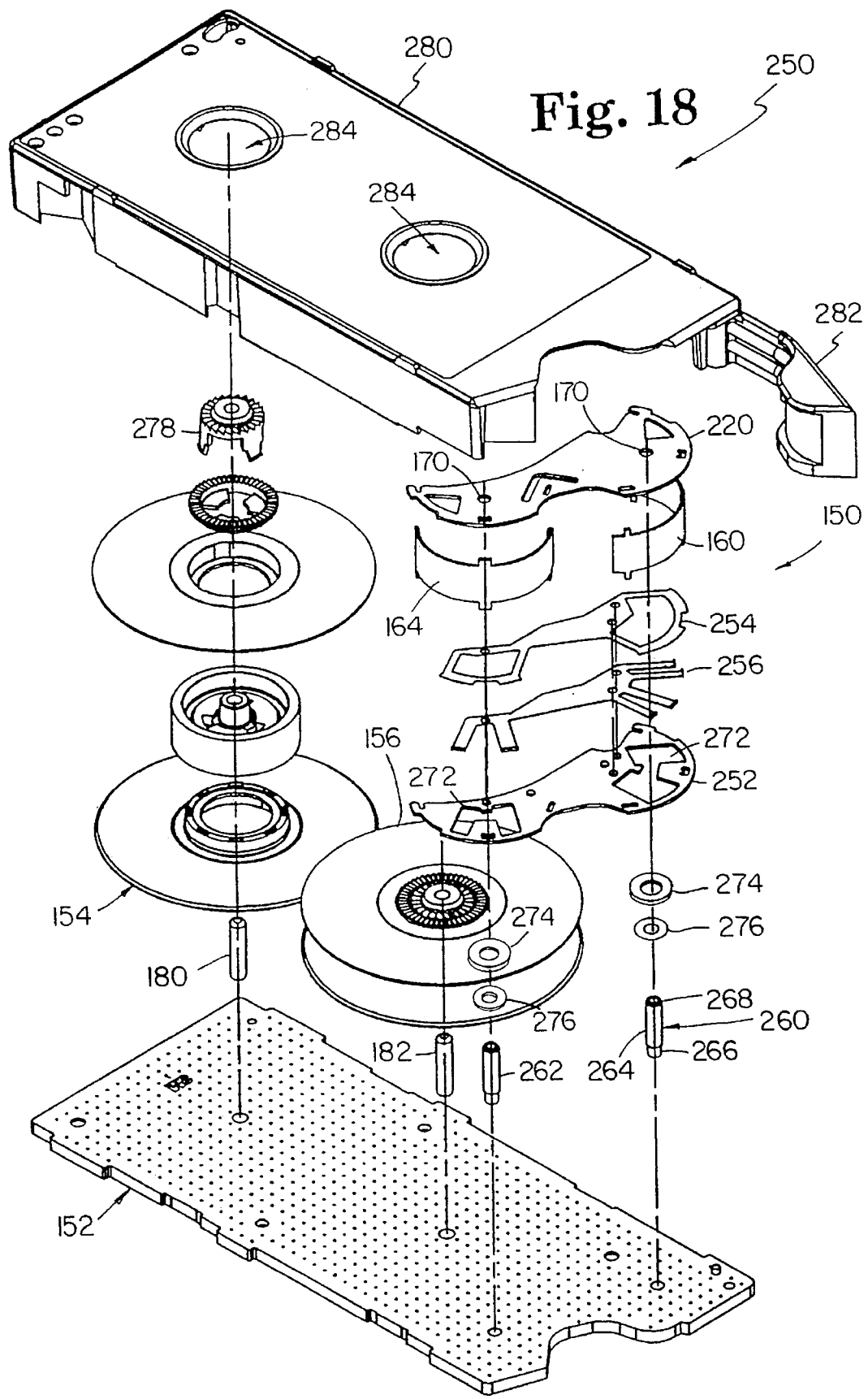

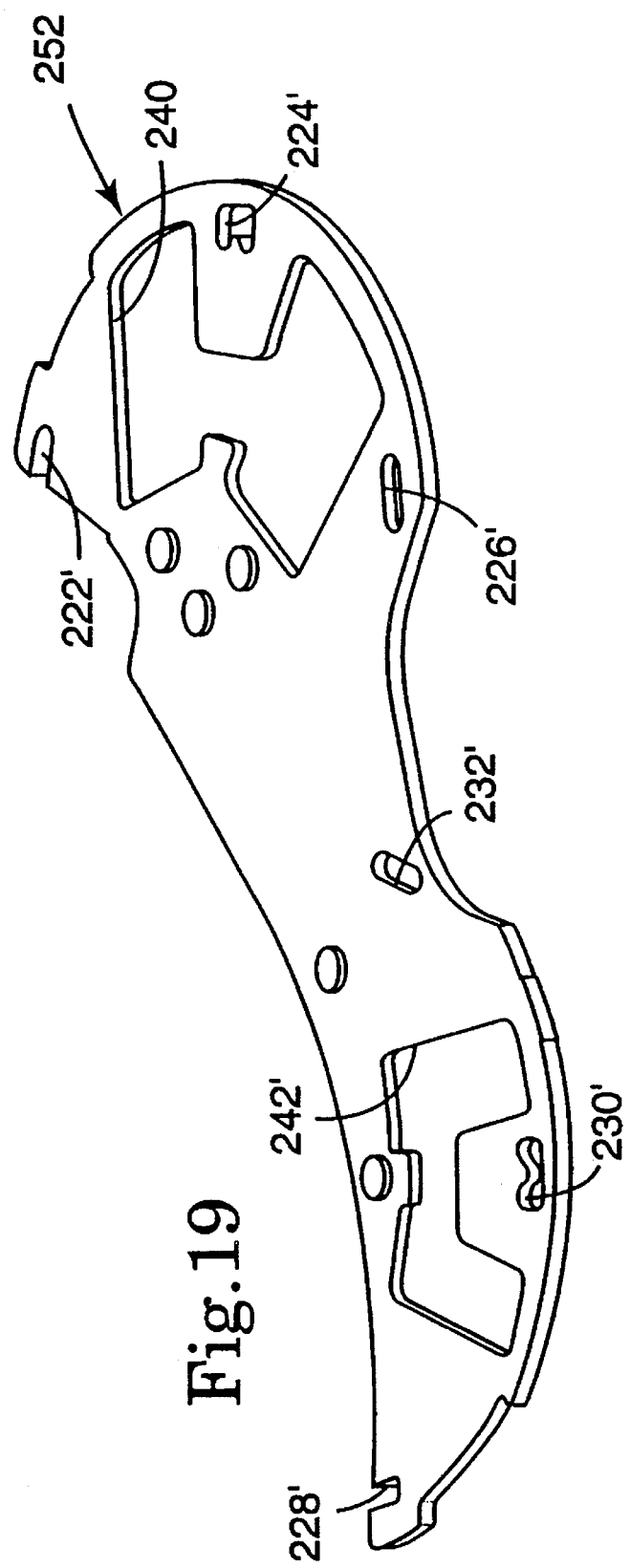

TAPE GUIDE MODULE FOR A DATA CARTRIDGE

REFERENCE TO RELATED APPLICATION

This Application is a continuation-in-part of U.S. patent application Ser. No. 08/086,322, entitled "TAPE GUIDE FOR A DATA CARTRIDGE" filed on Jul. 1, 1993, now U.S. Pat. No. 5,377,927.

BACKGROUND OF THE INVENTION

1. Field of the Invention

The present invention is directed to tape guides for guiding the tape in a reel-to-reel data tape cartridge, and more particularly, to a tape guide module containing a pair of tape guides configured to provide a tape guide adjacent to each side of a read/write zone in a data cartridge.

2. Description of the Related Art

The belt-driven data tape cartridge of von Behren, U.S. Pat. No. 3,692,255 has become a standard interface with computers where rapid acceleration and deceleration of the tape are required. In these reel-to-reel tape cartridges, an elastic driving belt extends along a belt path around corner guide rollers positioned adjacent the tape reels, contacts the tape on the reels, and drives the tape from reel to reel. A tape path extends between the reels and along one edge of the cartridge across a cutaway portion providing access to the tape by a transducer such as a magnetic read/write head which is a part of a tape drive which receives the cartridge. The tape path is defined by a guide pin, a pair of tape guides, and in some cartridges, a pair of tape wrap pins. One tape wrap pin is positioned between each reel and the adjacent tape guide to deflect the tape from a straight line path between the tape supply on the reel and the tape guide. This increases the frictional coupling between the tape and the tape wrap pin as the amount of tape wound on the reel increases and helps to maintain constant tape tension at the magnetic head.

Likewise, direct drive reel-to-reel cartridges have a tape path that extends through a cut-away portion on a cartridge. The cutaway portion defines a read/write zone where the tape is coupled with read/write heads in a tape drive.

In both belt-driven and direct-drive tape cartridges, the allowable tape speed and storage capacity (i.e., data density) increase with the accuracy at which the tape is coupled with the read/write heads. Therefore, further improvements in tape guide alignment has a direct positive impact on tape drive performance.

Both direct-drive and belt-driven tape cartridges must meet minimum tape tension specifications while simultaneously maintaining minimum drive force specifications. The tape tension must not fall below a certain level as the tape passes from reel to reel or contact between the read/write head and the tape will be insufficient. The minimum achievable tape tension should be sufficiently high to ensure proper cartridge operation. Similarly, the maximum required frictional drive force should be as low as possible to enhance cartridge operation within the power limitations of the drive motor. Thus, there is a limitation on the frictional drive force. The frictional drive force is that portion of the drive force which affects power loss at the interface between the backside of the tape and the tape guide. Minimizing the frictional drive force and improving tape tracking can be accomplished by minimizing the friction at the interface between the tape and the tape guides, which accounts for approximately one-third of the drive force in a data cartridge.

Early tape guides were made of a plurality of separate components staked together by a rivet. Upper and lower flanges or washers were fastened on the ends of a tape guide spacer. However, this system of assembly was subject to imprecise operation over time.

Injection molded plastic parts, while mass producible, do not guarantee durability, non-shedding, holding tight tolerances, or maintaining rigidity during use. Additionally, static build-up and dust collection are associated with dielectrics.

The current generation tape guides are made of a single piece of material that is machined, ground, or cast from a solid mass, such as non-magnetic stainless steel. This single piece construction requires that the tape guide be machined to accurately maintain the distance between the flanges and the overall part. Using stainless steel as a material for precision tape guides has resulted in expensive parts, due to the limited number of methods available for working stainless steel.

SUMMARY OF THE INVENTION

The present invention is directed to a tape guide module with a pair of tape guides which are configured to be disposed on opposite sides of a read/write zone in a data cartridge.

The tape guide module preferably includes first and second tape surface pieces having a plurality of tabs along the top and bottom edges thereof. The tape surface pieces are retained between top and bottom plates. The plates have a plurality of tab slots arranged to position the tape surface pieces on opposite sides of a read/write zone in a data cartridge. The first and second tape surface pieces separate the top and bottom plates by a fixed distance. An additional support member is included to maintain the separation between the top and bottom plates. The support member is preferably slightly shorter than the width of the tape surface pieces so that the top plate is biased towards the bottom plate. In the preferred embodiment, the tape guide module is mounted to a base plate of a tape cartridge. A biasing mechanism is inserted between the bottom plate and the base plate of the cartridge to bias the bottom plate towards the top plate.

The tape surface pieces preferably are constructed of a flexible material, such as non-magnetic stainless steel. The tape surface pieces preferably are cold-roll formed with a curvature greater than the curvature defined by the tab slots in the upper and lower plates, thereby causing the tape surface pieces to operate as a leaf spring when engaged with the plates.

The tape surface pieces are either straight or slightly convex along an axis perpendicular to the direction of tape travel. The straight or convex shape of the tape surface pieces causes a layer of air to form between the tape and the tape surface pieces, thereby reducing friction between the tape and the tape guide.

Flat tape surface piece blanks are preferably formed into the tape surface pieces by a calendering process. The calendering die is preferably slightly convex to prevent the tape surface pieces from developing a concave shape in the lateral direction. Additionally, the calendering process improves the surface finish and hardness of the tape surface pieces, obviating the need for a polished finish.

In the preferred embodiment, a portion of the top plate forms a flange bordering the surfaces of the tape surface pieces for aligning the tape to the tape guide module.

It will be understood that the present tape guide module may be used with a variety of tape cartridge configurations, including direct drive and belt-driven cartridges.

An alternate hub-driven tape cartridge embodiment has a base plate and a pair of rotating tape reels mounted thereto. The hub has a drive wheel for transmitting torque for rotating the tape reel. Magnetic tape is wound onto the tape reels. The tape guide structure is mounted to the base plate for guiding the tape longitudinally through a read/write zone. In the preferred embodiment, the read/write zone is proximate a cut away portion on the base plate.

DESCRIPTION OF THE DRAWINGS

FIG. 9 is a perspective view of a tape guide according to another embodiment of the present invention;

FIG. 10 is another perspective view of the tape guide of FIG. 9;

FIG. 11 is a side view of the tape guide of FIG. 9;

FIG. 18 is an exploded view of an exemplary tape cartridge utilizing the present tape guide module; and FIG. 19 is a perspective view of a preferred bottom plate for the tape guide module.

DETAILED DESCRIPTION OF THE PREFERRED EMBODIMENTS

Figure 1:
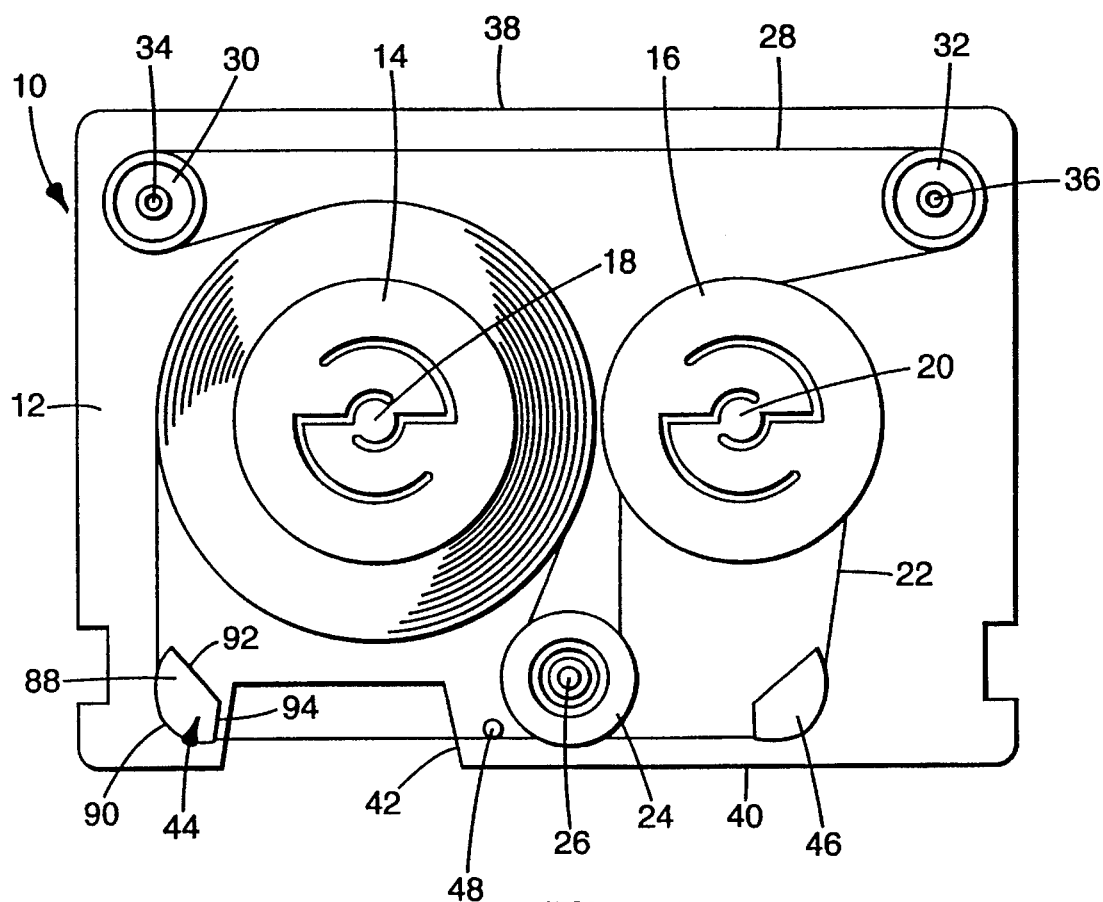
FIG. 1 is a top view of a belt driven data tape cartridge with the cover removed incorporating tape guides according to the present invention.

The drawings illustrate various data cartridges for use in a recording and/or reproducing machine, known as a tape drive (not shown). The tape drive typically includes a support frame including a horizontal cartridge support deck which supports a magnetic transducer or recording head, and in a depending manner, supports a reversible drive motor. The shaft of the drive motor extends through and carries a drive roller above the support deck. Guides position the cartridge on the support deck. FIG. 1 illustrates a top view of a tape cartridge having tape guides according to the present invention. The cartridge 10 is a thin generally rectangular enclosure.

As shown in FIG. 1, the cartridge 10 includes a base plate 12 and a cover (not shown). Two tape reels 14, 16 are mounted for rotation on respective tape reel pins 18, 20 pressed into the base plate 12, within the cartridge 10. The magnetic tape 22 is driven from reel to reel via a drive system including a drive roller 24 which is mounted for free rotation on a drive roller pin 26. The drive roller 24 drives a driving belt 28 which winds around corner guide rollers 30, 32 and the tape reels 14, 16. The guide rollers 30, 32 guide the driving belt 28 and are rotatably mounted on guide roller pivot pins 34, 36 mounted at opposite corners of the cartridge base plate 12 along a back edge wall 38 parallel to the front edge wall 40. The front edge wall 40 has a cutaway portion 42 for access to the magnetic tape 22 by the magnetic recording head. A door (not shown) closes the cutaway portion 42 when the cartridge 10 is not in use. An opening (not shown) extends into the front edge wall 40 to provide access for the drive roller of the tape drive.

The driving belt 28 is thin, continuous, flexible, and elastic. It extends along the belt path around the drive roller 24 and the corner guide rollers 30, 32 and contacts the tape 22 on the tape reels 14, 16. The un-stretched length of the driving belt 28 is less than the length of the belt path. Thus, when the belt 28 is stretched around the guide path it generates a belt tension which provides a frictional engagement force or side load between the guide rollers 30, 32 and their respective pivot pins 34, 36 as well as between the belt 28 and the tape reels 14, 16. The frictional engagement force also presses the tape layers together to prevent slipping of adjacent tape layers wound on the tape reels 14, 16 and spilling of the tape 22 from the supply reel. Since the frictional engagement force is dependent on belt tension, the tape tension and drive force are dependent on the belt tension.

The guide rollers 30, 32 have a predetermined coefficient of friction to provide a predetermined frictional coupling between each guide roller 30, 32 and its pivot pin 34, 36. This frictional coupling applies a predetermined frictional drag to the driving belt 28 as it passes around the guide rollers 30, 32 to increase the tension of the belt 28 and provide the proper tension drop between the tape reels 14, 16.

The tape guides 44, 46 also are located on the base plate 12 and guide the magnetic tape 22 to and from respective tape reels 14, 16. A guide pin 48 is disposed on the base plate 12 intermediate the two tape guides 44, 46 and assists the tape guides 44, 46 in guiding the magnetic tape 22. No tape wrap pins are required, although they can be used.

The tape 22 is convolutely wound on the tape reels 14, 16 in opposite directions. A tape guide path between the reels 14, 16 is defined by the tape guides 44, 46 and the tape guide pin 48. One tape guide 44 is positioned along the front edge wall 40 of the cartridge 10 on one side of the cutaway portion 42, and the other tape guide 46 and the guide pin 48 are positioned along the edge wall 40 on the opposite side of the cutaway portion 42.

Figure 4:
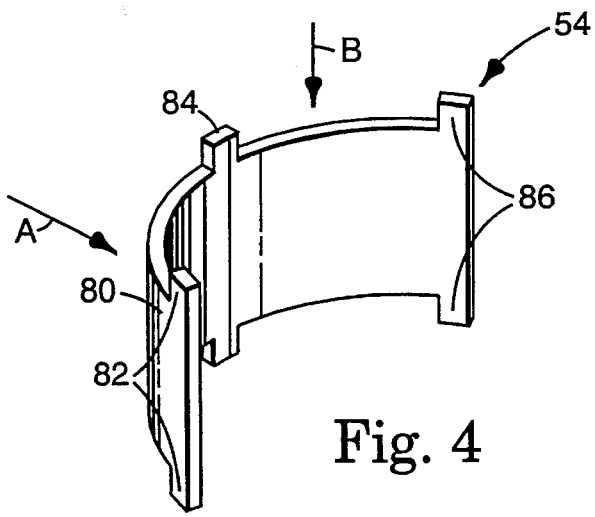
FIG. 4 is a perspective view of the tape surface piece of the tape guide of FIG. 3.
Figure 5:
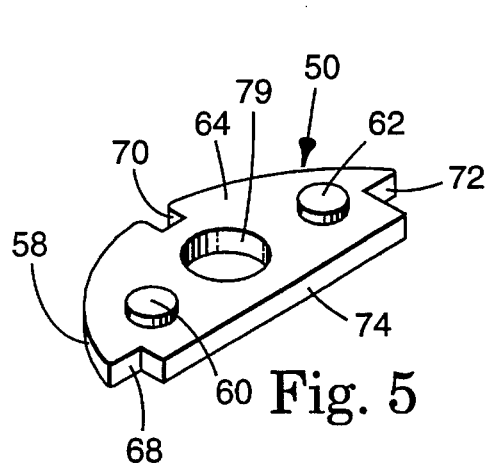
FIG. 5 is a perspective view of the flange piece of the tape guide of FIG. 3.
Figure 6:
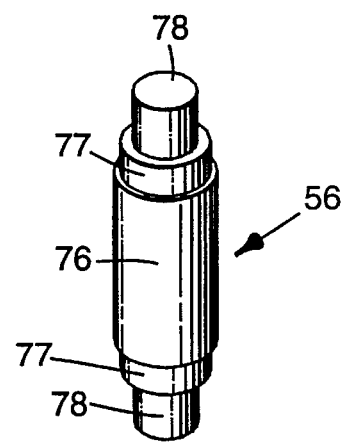
FIG. 6 is a perspective view of the post of the tape guide of FIG. 3.

The inventors have found that drawbacks to mass producing machined one-piece three-dimensional stainless steel tape guides are reduced significantly by using stamping or shearing technology and forming the tape guides of multiple components. Once the tooling is carefully accomplished, mass production at reasonable cost is practical. Notwithstanding that conventional wisdom dictates that stamped or sheared metal parts are not adequate for very precise applications like cartridge tape guides, the inventors have recognized a property of a specific type and thickness of sheared metal parts that permits their use in precise applications. Referring to FIG. 4, when a force is applied in the direction indicated by A, the component can easily bend or form to create curves, angles, pre-stressed, or preforms for spring loading, as is described below. However, if a force is applied in the perpendicular direction indicated by B to the same piece, the rigidity of the piece in that plane can be used to fix positions, to hold tolerances, and to lock a spring. This approach was used as the guiding principle throughout the design of the stamped tape guide.

The tape guide 45, shown in FIGS. 3–8, is formed of several separate components. Top and bottom flange pieces 50, 52 are separated by a tape surface piece 54 and a post 56. The top flange piece 50 and the bottom flange piece 52 are not identical. Each flange piece 50, 52 is generally semi-circular and can have a constant radius curved side. In the illustrated embodiments, the curved side 58 has a varying radius.

Each flange piece 50, 52 is formed with two half-shears or buttons 60, 62. The bottom flange buttons 60, 62 position the tape guide 45 on the base plate 12 of the cartridge 10 and the top flange buttons 60, 62 position the tape guide 45 on assembly tools. The buttons 60, 62 on the top flange piece 50 project out of the top surface 64 of the flange piece 50 and the buttons 60, 62 on the lower flange piece 52 project out of the bottom surface 66 of the flange piece 52. The buttons 60, 62 on the lower flange piece 52 are received within openings in the base plate 12 to prevent rotation of the tape guide around the axis of the post 56. Additionally, each flange piece 50, 52 includes three notches 68, 70, 72, one adjacent each interface of the curved side 58 and a straight side 74 of the flange pieces, and one at the center of the curved side 58. The notches 68, 70, 72 secure the tape surface piece 54.

The post 56 is cylindrical and includes a larger diameter central portion 76 which is disposed between the flange pieces 50, 52 and two smaller diameter end portions 78 which extend through the hole 79 in the flange pieces 50, 52. An intermediate diameter portion 77 of the post 56 determines the height of the tape guide. The intermediate portions 77 and the end portions 78 of the post 56 are press fit through the holes 79 to improve the integrity of the assembly by maintaining the components of the assembled tape guide 45 in the required locations. The post 56 also is the main mounting component and mounts the tape guide 45 to the base plate 12 of the cartridge 10.

Figure 7:
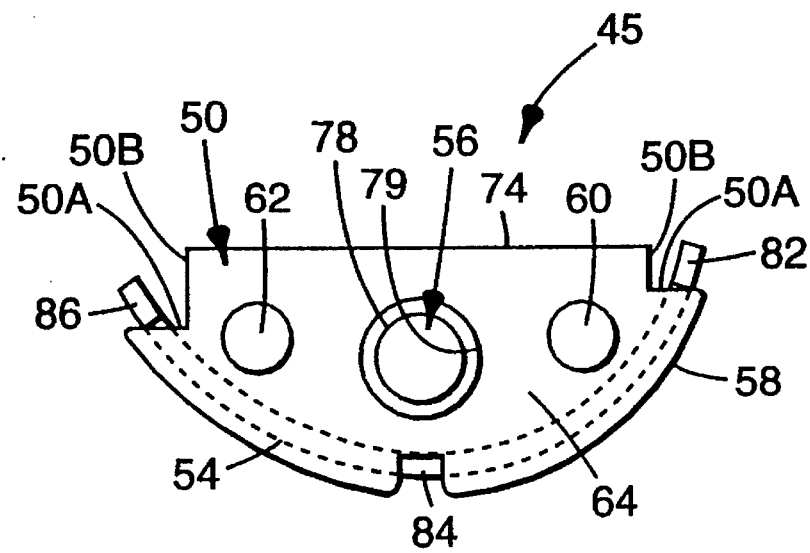
FIG. 7 is a top view of the tape guide of FIG. 3.

The tape surface piece 54 is curved and, when assembled onto the tape guide 45, forms a tape bearing surface 80 having a side profile which can be substantially identical to the curvature of the flange pieces 50, 52. Before it is formed with its curved shape, the tape surface piece 54 is generally rectangular with three pairs of tabs 82, 84, 86 projecting out of the rectangle. The tabs 82, 84, 86 are received in respective notches 68, 70, 72 in the flange pieces 50, 52 when the tape guide 45 is assembled. The tape surface piece 54 acts as a type of leaf spring that is loaded when it is assembled between the flange pieces 50, 52 and contacts the surfaces 50A of the flange piece 50, as shown in FIG. 7. Similarly, the tape surface piece 54 contacts the analogous surface of the flange piece 52. The tape surface piece 54 can be either underformed or overformed. In either instance, the tape surface piece 54 is bent against its internal biasing force when assembled to secure the tape surface piece 54 between the flange pieces 50, 52.

The lower tabs 82, 84, 86, can sit directly on the base plate 12 of the cartridge 10 to maintain the flanges parallel and to define the height of the tape guides. This also helps to maintain clearance between the bottom flange piece 52 and the base plate 12. This configuration loosens the precise manufacturing limits of the flange pieces 50, 52 and permits the flange pieces to be less precisely made. Loading the flanges 50, 52 during assembly biases the bottom flange piece 52 toward the top flange piece 50, removes any imprecisions, and flattens the flanges.

Figure 3:
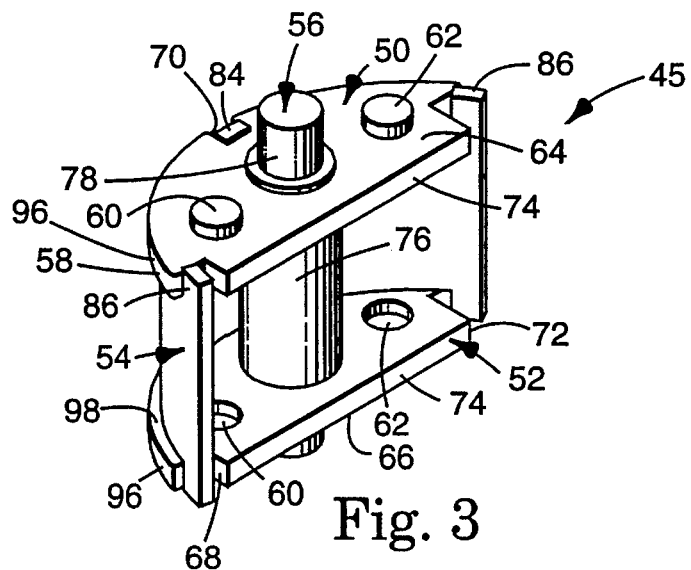
FIG. 3 is a perspective view of an alternative embodiment tape guide according to the present invention.
Figure 8:
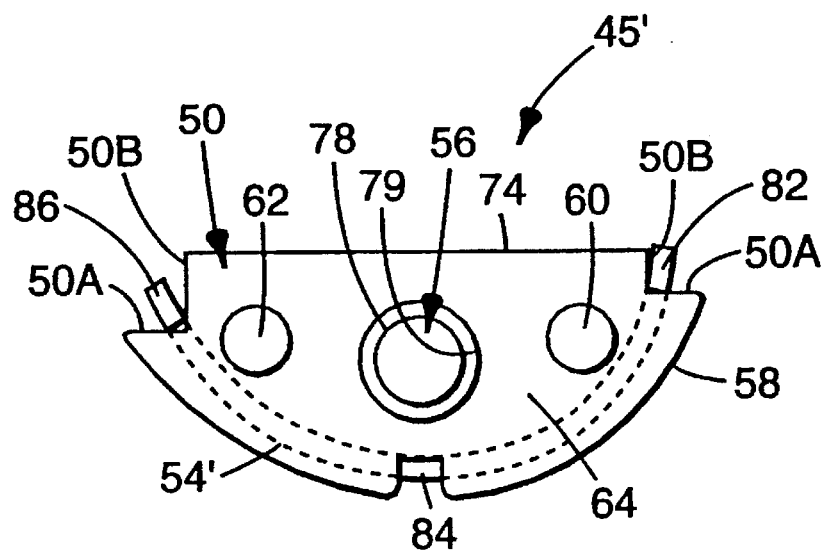
FIG. 8 is a top view of a tape guide according to another embodiment of the present invention.

As shown in FIG. 3, the bearing surface of the tape guide 45 can form flanges 96 which are formed from the flange pieces 50, 52 and which constrain and guide the tape 22 within a trough 98. As shown in FIG. 8, the tape surface piece 54 can be shaped to contact both surfaces 50A and 50B of the flange piece 50 when the tape surface piece 54 is bent to be secured between the flange pieces 50, 52. Also, the tape surface piece 54 can contact both surfaces of the flange piece 52.

The assembly of the tape guide 45 from its component pieces can be totally automated and is a variation of what is called "watch plate construction." That is, the top and bottom flange pieces 50, 52 are keyed together by the tape surface piece 54 via the interlocking of the tabs 82, 84, 86 and the notches 68, 70, 72. In this configuration, the components are formed by stamping while yielding the same accuracies as machining and grinding. This assembled tape guide 45 can be made and assembled for approximately one-half of the cost of the current one piece tape guides when made in large volumes. The above also applies for the top and bottom plates 220, 252 and the right and left tape surface pieces 160, 164, discussed below.

FIGS. 9–11 show an alternative embodiment of a tape guide 100 which also is formed of four separate components and is similar to the tape guide 45 of FIGS. 3–8 except as described differently below. Top and bottom flange pieces 102, 104 are separated by a tape surface piece 106 and a post 108. The top flange piece 102 and the bottom flange piece 104 are not identical. Each flange piece 102, 104 is generally semi-circular having a curved side 110 with a varying radius. Each flange piece 102, 104 includes an arm 112 and a notch 114. The notch 114 is at the center of the curved side 110. The arm 112 and the notch 114 secure the tape surface piece 106. The tape surface piece 106 includes tabs, 122, 123, 124. The tab 122 is disposed against the arm 112 and the tab 123 is received in the notch 114. The tab 124 is disposed against the straight side 118 of the flange pieces 102, 104. Like the embodiments of FIGS. 3-8, the tape surface piece 106 serves as a tape bearing surface and is curved and, when assembled onto the tape guide 100, forms a surface 120 having a side profile which can be substantially identical to the curvature of the flange pieces 102, 104. Cutout portions 103, 105 can be formed in the top and bottom flange pieces 102, 104.

The post 108 is generally flat and extends for approximately half of the length of the straight side 118, although other lengths can be used. The post 108 includes a central portion 126 and can have an upper portion 128 which overlaps the top flange piece 102. The post 108 can have two sets of notches. The notches at the upper portion 128 of the post 108 and the upper portion 128 can be received in the cutout portion 103 of the top flange piece 102.

Two legs 130, 132 are formed at the bottom of the central portion 126 of the post 108 and each leg has a respective barb 134, 136 which, as shown, extends in a direction opposite the barb on the other leg and toward the respective outside of the tape guide 100. The notches at the legs 130, 132 of the post 108 and the legs 130, 132 can be received in the cutout portion 105 of the bottom flange piece 104. When the tape guide 100 is assembled into a data cartridge, the ends of the legs are received within one large or two smaller openings in the cartridge base plate 12 and the barbs dig into the side of the opening walls to secure the tape guide. The post 108 is the main mounting component and mounts the tape guide 100 to the base plate 12 of the cartridge 10. Additionally, the post 108 can be used as a carrier during assembly of the tape guide 100 to transport the assembled tape guide 100 to the location of the tape cartridge assembly.

When the tape guide 100 is assembled, the perpendicular distance along the flat post 108 between the flange pieces 102, 104 is less than the width of the tape surface piece 106. This causes the post 108 to spring load and lock the flange pieces 102, 104 in the vertical plane against the tape surface piece 106, to maintain contact between the tape surface piece 106 and the flange pieces 102, 104, and to set the distance between the flange pieces. The post 108 also prevents angular rotation of the tape guide 100 in the horizontal plane around the axis of the post, because the legs 130, 132 are disposed within one or more openings in the base plate 12.

Also, the tabs 122, 123, 124, like the tabs 82, 84, 86 of the tape guide 45, can be long enough to reach the surface of the base plate 12 when the tape guide is mounted in the cartridge. The tabs would then assist in maintaining the tape guide perpendicular with the base plate, in maintaining the height of the tape surface piece, and in preventing the tape guide from wobbling back and forth.

Figure 12:
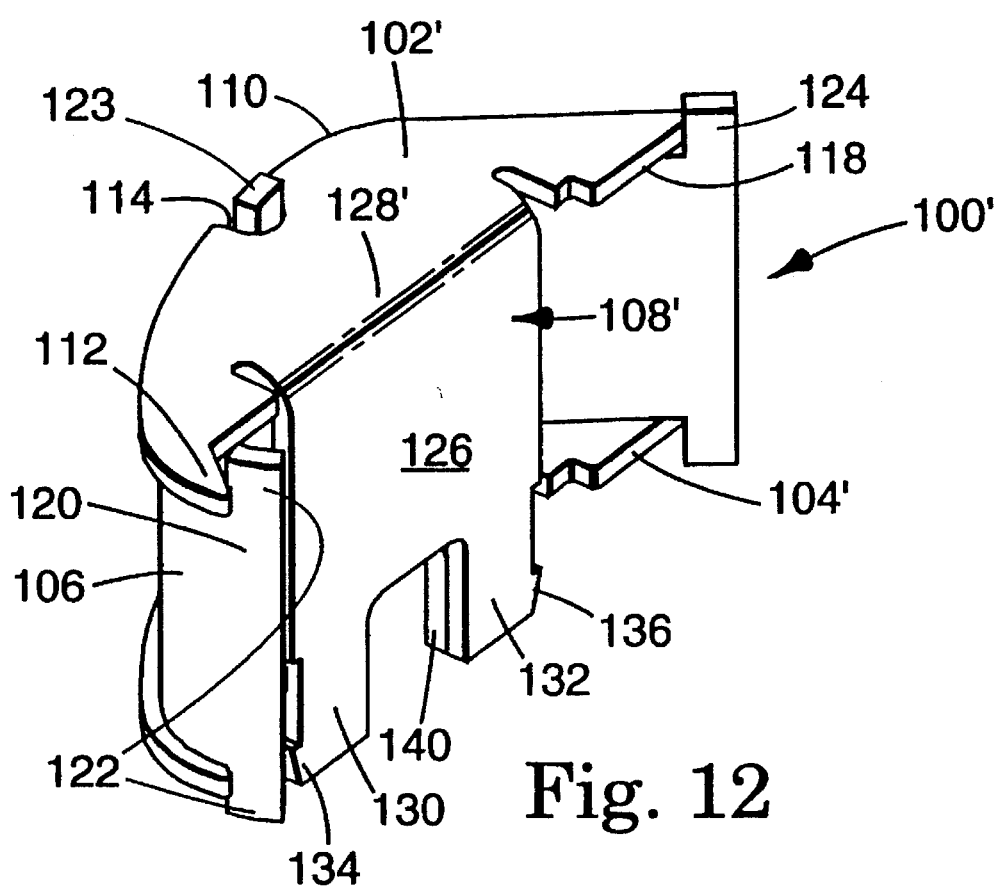
FIG. 12 is a perspective view of a modified version of the tape guide of FIG. 9.

In FIG. 12, the post 108' and the top flange piece 102' are formed as a single element, connected by the upper portion 128' with the post 108' bent at a right angle with the top flange piece 102'. Also, the bottom flange piece 104' has a flange 140 which is formed with the flange piece 104' and is bent at a right angle with the flange piece 104'. The flange 140 combines with the legs 130, 132 of the post 108' to help secure the tape guide 100' in the cartridge.

In the embodiment shown in FIG. 1, the tape guides have a sector-shaped body 88 with a curved tape bearing surface 90 and two unequal length planar surfaces 92, 94. The planar surface 92 that intersects the bearing surface 90 that is intended to be mounted in the tape cartridge 10 closer to the adjacent tape reel is longer than the other planar surface 94. This configuration improves the manufacturing process and facilitates fitting the tape guides into a tape cartridge.

Figure 13:
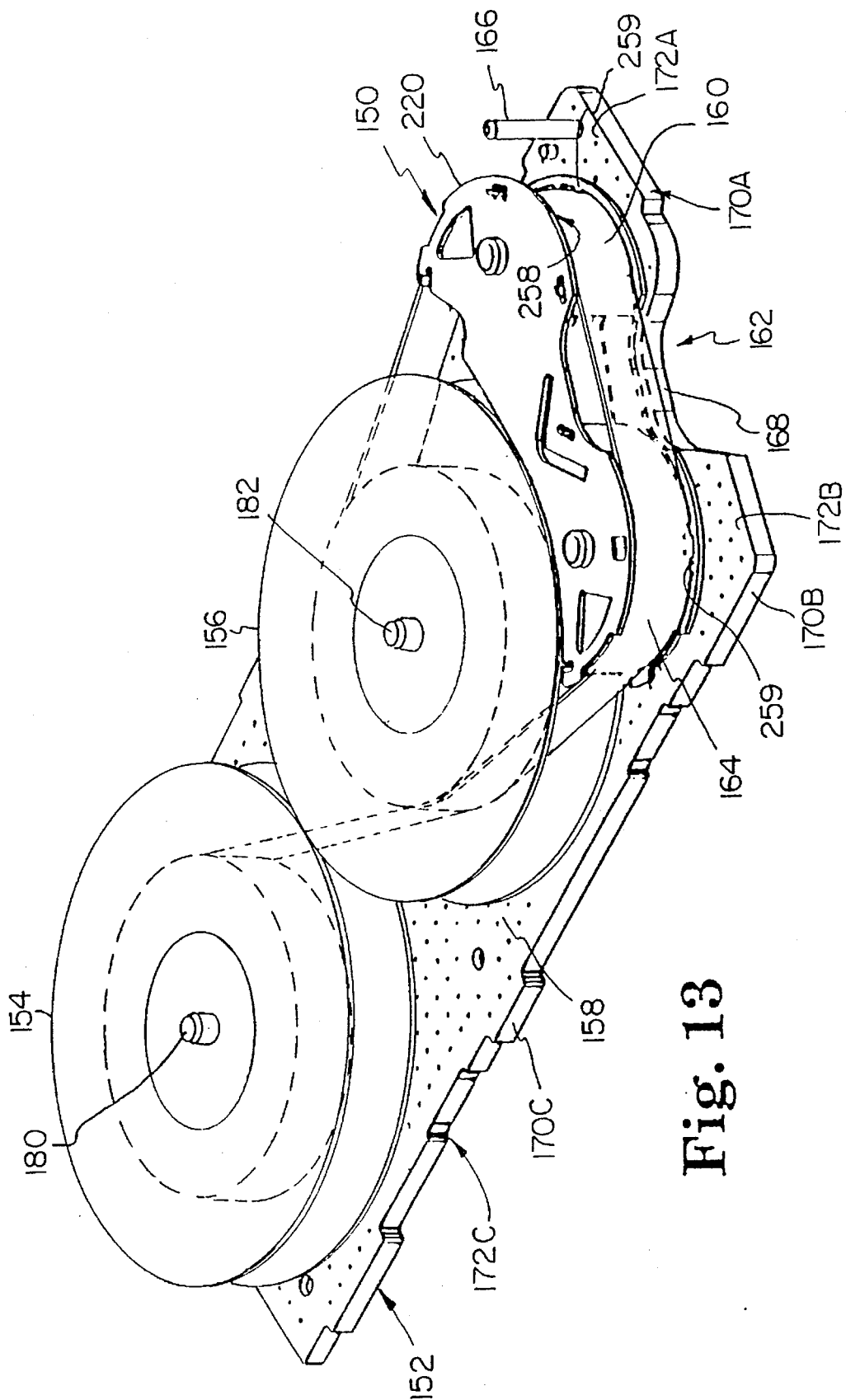
FIG. 13 is a perspective view of a tape cartridge base plate showing engagement of the preferred tape guide module with a magnetic tape.

FIG. 13 is a perspective view of an alternate tape guide module 150 mounted to a base plate 152. Front and rear tape reels 156, 154 containing a magnetic tape 158 are rotatably mounted to the base plate 152. The tape 158 traverses a path from the front tape reel 156 across right tape surface piece 160, through a read/write zone 162 to a left tape surface piece 164, and back to the rear tape reel 154. The read/write zone 162 preferably is proximate a cut-away portion 168 in the base plate 152 so that the tape 158 is supported in space proximate the cut-away portion 168 for engagement with the read/write heads of a tape drive (not shown).

The tape guide module 150, which will be discussed in greater detail below, provides a single structure, capable of mass production, with a pair of tape surface pieces, 160, 164 disposed on opposite sides of a read/write zone 162. Since the tape surface pieces 160, 164 are connected as part of a single module or structure, tolerance build-up is minimized. In particular, the path length as measure along the top and bottom edges of the tape is approximately the same, so that lateral and longitudinal tape tension is generally consistent.

The tape guide module 150 additionally facilitates tilt-alignment of the module 150 with the base plate 152.

The tape guide module 150 preferably is aligned with penetration datums 170A, 170B, 170C on the edges of the base plate 152 and a guide plate datums 172A, 172B, 172C on the top and bottom surfaces of the base plate 152. These datum points are also used to align the data cartridge (see FIG. 18) in the tape drive (not shown). While it is preferred to measure all the guide plate datum points from the top surface of the base plate 152, it will be understood that the data cartridge cover (see FIG. 18) obstructs access, so that the datum point 172C is alternatively measured on the bottom of the base plate 152 near tape reel pin 180.

Tape reel pins 180, 182 (see FIG. 18) preferably are inserted into the base plate 152 with reference to the location of the tape guide module 150 and the datums 170A–C, 172A–C. It has been found that the preferred tape guide module 150 can be aligned with the tape reels 154, 156 to an accuracy of ±0.002 inches (0.0508 mm).

Figure 14:
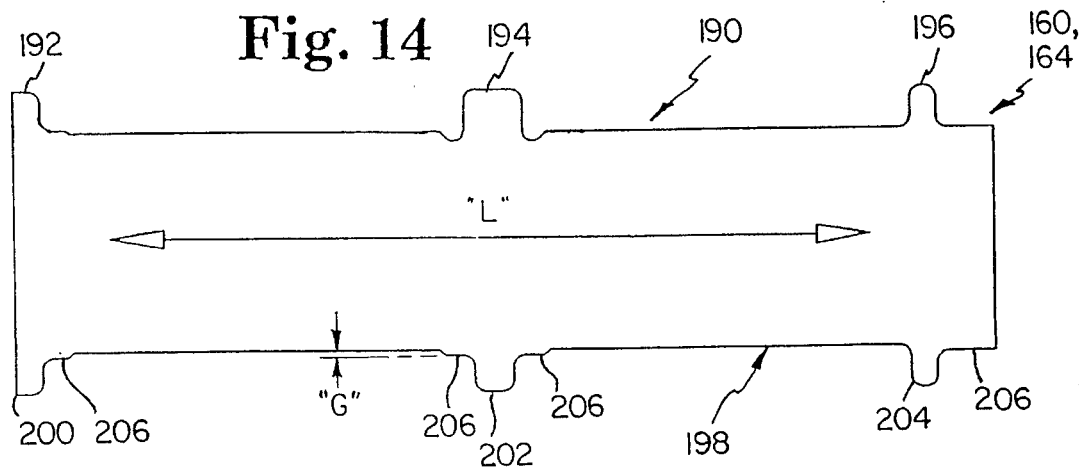
FIG. 14 illustrates the flat metal geometry of a preferred tape surface piece.

FIG. 14 is a top view of the flat metal geometry of the preferred tape surface piece 160, 164. As will be discussed below, the tape surface pieces 160, 164 preferably are stamped from nonmagnetic stainless steel stock. However, it will be understood that a variety of materials may be suitable for this purpose. The top edge 190 includes three tabs 192, 194, 196. The bottom edge 198 likewise includes three tabs 200, 202, 204. It will be understood that the number of tabs may vary and the disclosed embodiment in no way limits the scope of the invention. The tape 158 travels along a longitudinal axis "L", which preferably is the direction of the grain of the material forming the tape surface pieces 160, 164. The bottom edge 198 optionally may includes a series of shoulders or raised portions 206 which creates a space between the bottom plate 152 and the bottom edge 198 of the tape surface pieces 160, 164, as discussed below.

Figure 15:
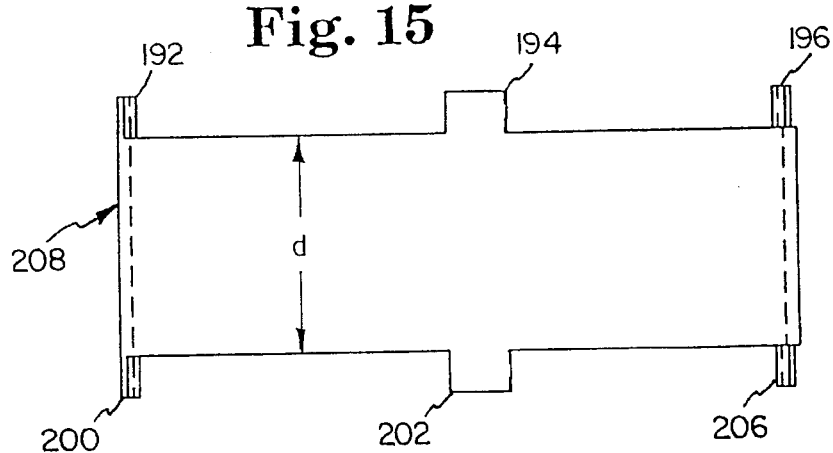
FIG. 15 is a side view of a preferred tape surface piece.
Figure 16:
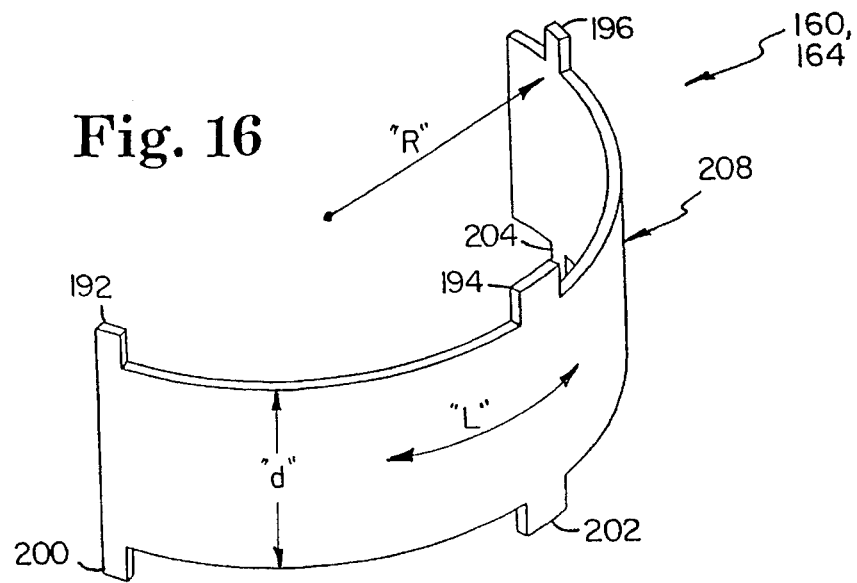
FIG. 16 is a perspective view of a preferred tape surface piece.

FIGS. 15 and 16 illustrate the tape surface pieces 160, 164 with tabs 192, 194, 196, 200, 202, 204 after being cold rolled formed with a radius "R" The tape bearing surface 208 extends along an axis "L". In the preferred embodiment, the tape bearing surface 208 has a width "d" which is preferably straight or alternatively slightly convex along an axis perpendicular to the longitudinal axis "L". The tape bearing surface 208 causes a self-acting air film to form between the tape 158 and the surface 208, thereby reducing debris generated due to friction between the tape 158 and the surface pieces 160, 164.

Since the calendering process tends to cause the tape surface pieces 160, 164 to develop a concave tape bearing surface 208, the calendering roller is preferably slightly convex. The straightness of the tape bearing surface 208 in the vertical direction "d" is therefore between 0.0000 inches and 0.0004 inches, although preferably 0.0000 inches. The calendering process also improves the surface finish and hardness, so that a lower grade material may be used and a polished surface is unnecessary.

Figure 17:
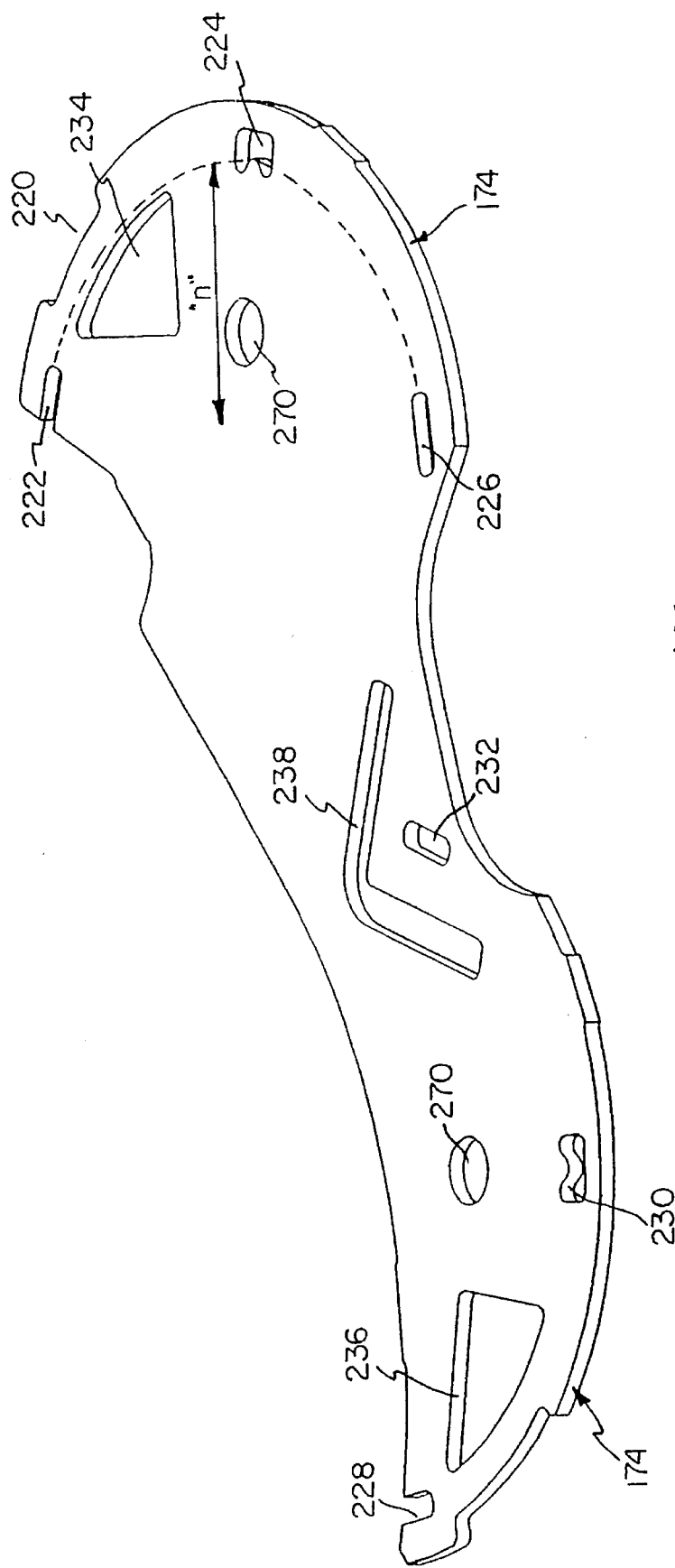
FIG. 17 is a perspective view of a preferred top plate for the tape guide module.

FIG. 17 is a perspective view of the preferred top plate 220 of the tape guide module 150. Three slots 222, 224, 226 are provided in the top plate 220 for the right tape surface piece 160. Likewise, three slots 228, 230, 232 are provided in the top plate 220 for receiving the tabs of the left tape surface piece 164. The slots 220, 224, 226, 228, 230, 232 are arranged on the top plate 220 to have a radius of curvature "r" which is slightly smaller than the radius "R" of the tape surface pieces 160, 164 (see FIG. 16). Consequently, when the tape surface pieces 160, 164 are engaged with the top plate 220, the tabs 192 and 196 press outward against tab slots 222, 226, 228 and 232, respectively. Simultaneously, the tab 194 presses inward on the tab slots 224 and 230. When assembled into the complete tape guide module 150, the tape surface pieces 160, 164 operate similar to a leaf spring compressed between the top and bottom plates 220, 252 to maintain the pieces, 160, 164 in tension with the tab slots 220–232.

The bottom plate 252, illustrated in FIG. 19, contains a preferably identical tab slot configuration 222', 224', 226', 228', 230', 232'. In the preferred embodiment, the tab slots 220–232 and 220'–232' are formed using the same tooling on both the top and bottom plates 220, 252. The top plate 220 contains a series of relief cut-outs 234, 236, 238 to distribute pressure more uniformly to ensure better contact with the tape surface pieces 160, 164. The bottom plate 252 contains cut-outs 240, 242.

FIG. 18 is an exploded view of an exemplary tape cartridge 250 utilizing the preferred tape guide module 150. It will be understood that the cartridge 250 is for example only and the tape guide module 150 may be used in a belt driven cartridge or a variety of other magnetic tape storage devices, and that the disclosed tape cartridge 250 in no way limits the scope of the invention.

The tape guide module 150 includes a top plate 220 and a bottom plate 252 engaged with the tabs on the tape surface pieces 160, 164. The tabs 200, 202, 204 (see FIGS. 14–16) preferably extend through slots in the bottom plate 252 and rest on the base plate 152 to maintain the tape guide module 150 perpendicular to the base plate 152, to maintain the height of the tape surface pieces 160, 164 relative to the base plate 152, and to prevent the tape guide module 150 from wobbling relative to the plane of the base plate 152. The shoulders 206 rest on the bottom plate 252 and create a gap "G" (see FIG. 14) between the bottom edge 198 of the tape surface pieces 160, 164 and the bottom plate. The gap "G" may be used to receive a biasing member to bias the tape 158 against the top plate 220.

FIG. 18 illustrates a foil member 254 and a series of tape guide biasing fingers 256 interposed between the bottom edge 198 of the tape surface pieces 160, 164 and the bottom plate 252. The tape guide fingers 256 create a biasing force on the foil member 254 which may be used to guide the tape (not shown). As is illustrated in FIG. 13, the top plate 220 extends beyond the tape surface pieces 160, 164, forming a flange 258 for aligning the tape relative to the tape guide module 150 and the reels, 154, 156. The foil member 254 and biasing member 256 may optionally be used to form an opposing compliant or variable flange 259 to bias the tape 158 against the fixed flange 258. It will be understood that the compliant flange 259 is not required for the present invention and the lower plate 252 can operate as a lower flange.

Turning back to FIG. 18, the tape guide module 150 includes a pair of post structures 260, 262 for supporting and maintaining the separation between the top plate 220 and the bottom plate 252. The preferred post structures includes a large diameter central portion 264 with smaller diameter end portions 266, 268 which extend through the openings 270, 272 in the top and bottom plates 220, 252, respectively.

A guide spacer 274 and spring 276 preferably are interposed between the bottom plate 252 and the base plate 152 to bias the bottom plate 252 towards the top plate 220. In the preferred embodiment, the posts 260, 262 are shorter than the distance "d" (i.e., width of the tape surface pieces, 160, 164 as illustrated in FIG. 15) so that the top plate 220 is also biased towards the bottom plate 252. Alternatively, the guide spacer 274 and spring 276 may be achieved by forming a biasing member in the lower plate 252.

The bias force created by the spring 276 must be less than the bias force placed on the top plate 220 by the posts 260, 262 so that the net biasing force retains the tabs 200–204 against the base plate 152. Preferably, the downward bias force is at least twice that of the upward bias force. The openings 270, 272 are preferably located in the center of a triangle defined by the slots 220–226 and 228–232, respectively, so that the pressure on the tape surface pieces 160, 164 is generally evenly distributed.

The exemplary tape cartridge 252 is a direct drive configuration in which the tape reels 154, 156 include a drive wheel 278 for engagement with a driving force in the tape drive (not shown). A cover 280 is provided for enclosing the cartridge 250. The cover 180 preferably has openings 284 to permit engagement between the drive wheels 278 and the tape drive. A door 282 attached to the cartridge 250 by hinge pin 166 may optionally be included to protect the tape 158 when the cartridge 250 is not in a drive.

The method of making the tape guides and assembling them to the base plate of cartridges includes several steps. First a continuous sheet of metal blank, which can be used to make several of the tape guide components, is maintained flat, such as by straightening. The metal blank is sheared to make a rectangular tape surface piece having top and bottom edges with projecting tabs set precisely in the top and bottom edges to define the vertical height of the tape guide. The metal blank is sheared to make a top flange piece and a bottom flange piece each with a curved edge and having notches. The tape surface piece is cold roll formed to a radius of curvature slightly larger than the predetermined final radius of curvature of the tape surface piece after assembly into a tape guide. A post is made and attached to the top and bottom flanges and the projecting tabs of the top and bottom edges of the tape bearing surface piece are interlocked with the corresponding notches of the top and bottom flange pieces. The tape surface piece acts as a spring that defines and holds together the tape guide. The convex surface of the tape surface piece to desired smoothness as a tape bearing surface.

The post can be made cylindrical by lathe turning to form a generally cylindrical body and successively smaller diameter generally cylindrical intermediate and end portions on each side. This tape guide can be mounted into a base plate of a cartridge by inserting the smallest end of the post in an opening in the base plate.

Alternatively, the post can be made generally flat by shearing a metal blank to make the post with a top portion with notches, a central portion with notches, and a bottom portion formed of two legs. Each leg can have a barb on the outside extending in opposite direction to the barb on the other leg. The post legs are inserted in corresponding openings in the base plate of the cartridge to secure and locate the tape guide in the plane of the base plate.

The flat post can be formed by shearing a metal blank as a contiguous part of the top flange and by bending the post at right angles to the flange to cold form the post as an extended portion of the sheared blank piece for the top flange. Additionally, at least part of the bottom portion of the post can be formed as a contiguous part of the bottom flange by bending the part of the bottom portion of the post at right angles to the flange in the same direction as the extended portion of the top flange to cold form the post as an extended portion of the sheared blank piece for the bottom flange. The extended portions of both flanges each include a pair of legs having a thickness half that of the assembled legs. The half thickness legs are joined together to form the completed legs.

The flat post 108 spring loads the flanges 102, 104 in the vertical plane against the tape surface piece 106 and prevents angular rotation of the tape guide 100 in the horizontal plane around the axis of the post. This eliminates the lathe turning step, the half shearing for the buttons on the flanges, and an extra bore in the base plate, as compared with cylindrical posts, as described below. When the post 108' is formed with the top flange piece 102' and the bottom flange piece 104', a fourth assembly part, the separate post, is eliminated.

Additionally, the tape guides 44, 45, 46, 100, 100' have a much larger radius of curvature than the guide pin 48. The surface area and roughness in combination with the larger radius tape guide allow the tape 22 to travel past the guides with little contact with the bearing surface as the tape rides on a self-acting air film. The tape 22 actually lifts off of the guides 44, 45, 46 by at least one micron in some cases. This is measured using a photonic sensor such as an MTI 1000 Fotonic™ Sensor using a 3808 module made by Mechanical Technology Inc. The large radius provides a mechanism for hydrodynamic lift, as known from Reynold's equation, by creating a film of air under the tape 22 between the tape 22 and the tape guide. This is accomplished without resort to known systems such as air jets. This reduces the tape backside-to-tape guide friction, and reduces the drive force by up to 25 percent, thereby reducing the power dissipation. Preferably, the tape 22 will not contact the tape guides at all, although the tape is expected to contact the guides at some points during operation. It is sufficient to achieve the above advantages that the tape 22 not contact the tape guides along most of the circumference of the tape guides.

Similarly, the tape tracking is improved by up to 50 percent and there are no shuffle-induced speed variations when the tape guides 44, 45, 46, 100, 100' are used as shown in tests using 2.5 cm (1 in) diameter tape guides. Moreover, the range of tape tensions, that is, the difference between the maximum and minimum tape tensions from the beginning of the tape to the end of the tape are reduced. This reduction obviates the need for tape wrap pins which need not be used. In tests comparing the frictional drive force of a single radius [0.27 cm (0.105 in) radius] tape guide with single radius [0.95 cm (0.375 in) radius], compound radius [1.27–0.64 cm (0.5–0.25 in) radius], and single radius [1.27 cm (0.5 in) radius] tape guides at various tape speeds, the large radius tape guides uniformly require lower frictional drive forces. The following frictional drive forces in Newtons were attained for the four tape guides at speeds of 0.76, 1.52, 2.29, and 3.05 meters per second (30, 60, 90, and 120 in per second), respectively:

| Tape Speed | Tape Guide Radius (cm) | | | |
|---|---|---|---|---|
| (m/s) | .27 | 0.95 | Compound | 1.27 |
| | | Frictional Drive Force (N) | | |
| .76 | .42 | .30 | .25 | .19 |
| 1.52 | .44 | .22 | .12 | .08 |
| 2.29 | .47 | .21 | .10 | .08 |
| 3.05 | .44 | .14 | .08 | .06 |

Figure 2:
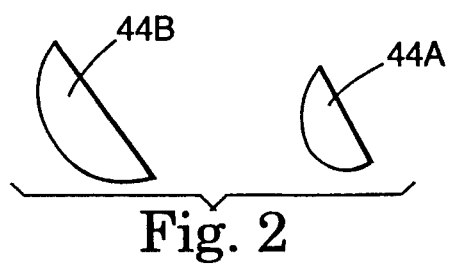
FIG. 2 is a comparison of a constant radius tape guide with a varying radius tape guide.

This larger radius of curvature can be constant, and be in the range of 0.6 cm to 1.27 cm. Alternatively, to compensate for the space limitations within the data cartridge 10, the radius of curvature can vary, for example varying from a larger radius at the ends to a smaller radius of 0.6 cm (0.25 in) in the middle, as shown in FIG. 1. As shown in FIG. 1, the two tape guides 44, 46 can have different shapes to accommodate the different space constraints of the data cartridge. The inflection points are blended together with a surface finished, for example, with a 3 micron lapping film such as 3M brand Imperial Lapping Film with 3 micron grade and a 1 mil backing. As shown in FIG. 2, the shape of the varying radius tape guide 44A is much smaller than that of the constant radius tape guide 44B. The varying radius can simply be a compound radius including three separate radii blended together or can be formed of curves such as ellipses or hyperbolas which have varying radii. In FIG. 2, the tape guide 44A represents a tape guide with a single 1.27 cm (0.5 in) radius and the tape guide 44B represents a tape guide with a radius that is 1.27 cm (0.5 in) at the ends and 0.6 cm (0.25 in) in the middle.

The larger radius at the ends provides the desired large radius effects at the entrance of the tape guide 44, 45, 46, 100, 100' for either tape direction. Although the radius in the middle of the tape guides is smaller, and although the air film requires a large radius to be entrapped, once the air film is entrapped in an air bearing due to a large radius, it will remain substantially entrapped regardless of subsequent smaller radius contours. Thus, the hydrodynamic lift is carried over the smaller radius portion to reduce the friction between the tape backside and the tape guide. Tests have confirmed that the varying radius tape guide attains similarly small frictional losses at the interface between the tape backside and the tape guide and that these losses are smaller than those attained with known tape guides having a 0.25 cm (0.1 in) radius.

Moreover, the large radius tape guides 44, 45, 46, 100, 100' whether of single or varying radius, and the flanges 96 create a long trough as the tape 22 enters the tape guide. The tape guides serve as a guiding surface which, as it is lengthened, reduces tape pack misregistration. The long trough steers, guides, and aligns the magnetic tape before the tape passes the read/write head to prevent tape wandering, to improve the tape wrap on the reel, and to improve tape tracking. The trough also dampens the effects of the tape hubs in the tape tracking spectrum.

The surface finish of the tape guides 44, 45, 46, 100, 100' also can affect the performance of the cartridge 10, as different surface smoothness levels affects the level of air entrapment between the tape and the tape guide. If the finish is too rough the air film may not be entrapped. A surface finish that is too smooth could result in degraded drive force performance at low tape speeds. Tests have shown that tape guides made of Type 303 stainless steel with the bearing surface polished using lapping film with a diamond grit of 3 microns and having a surface finish, measured with a Taylor-Hobson Talysurf profilometer, ranging from 0.013 to 0.038 microns (0.5 to 1.5 micro-inches) in average roughness work well. Thus, if needed, the performance of the cartridge can be altered by selecting a tape guide radius or surface roughness to permit the desired level of air entrapment.

The method of making the tape guide module 150, assembling it, and mounting it to the base plate 152 of cartridges is similar to the method of manufacturing discussed above. A metal blank is sheared to form the generally rectangular tape surface piece 160, 164 having top and bottom edges 190, 198 with projecting tabs 192, 194, 196, 200, 202, 204 set precisely in the top and bottom edges, respectively, and to define the vertical height "d" of the tape guide. The metal blank is sheared to make a top plate 220 and a bottom plate 252 each with a curved edge 174 and having notches 220–232. The tape surface pieces 160, 164 are cold roll formed to a radius of curvature "R" slightly greater than the predetermined final radius of curvature "r" of the tape surface piece after assembly into a tape guide module 150. The die for cold roll forming the tape surface pieces 160, 164 is preferably slightly convex so that the tape bearing surface 208 are straight or slightly convex along an axis perpendicular to the direction of tape travel.

The calendering process has been shown to improve the surface finish of the tape surface pieces 160, 164. Consequently, the tape surface pieces 160, 164 do not require polishing and a lower cost material may be used. Using relatively standard grade materials, a calendered surface can support flying as well as a highly polished (N2) surface.

The post structures 260, 262 are made and attached to the base plate 152. The top and bottom plates 220, 252 and the projecting tabs 192–196 and 200–204 of the top and bottom edges 190, 198 of the tape surface pieces 160 164 are interlocked with the corresponding notches 220–232, 220'–232' of the top and bottom plates 220, 252. The tape surface pieces 160, 164 acts as a spring that defines and holds together the tape guide structure 150. The tape guide module 150 is then mounted onto the posts 260, 262 on the base plate 152 and attached using conventional means. It will be understood that the posts may alternatively be made generally flat, similar to post 108 as illustrated in FIGS. 9–12, the manufacturing and assembly of which is discussed above.

The surface area, smoothness, and straight or slightly convex shape in the lateral direction of the tape surface pieces 160, 164 preferably allows the tape 158 to ride on a self-acting air film. The tape 158 actually lifts off of the tape surface pieces 160, 164 by at least one micron in some cases. As a result, less debris which can interfere with the operation of the drive is generated from the contact of the tape with the tape surface pieces and less power is needed to operate the tape drive. However, it will be appreciated that to achieve this effect, significant care may have to be taken during assembly to ensure that the tape is properly aligned as it enters and leaves the tape guide, e.g., through careful placement of the assembled guide, reels, reel pins and the like in the cartridge.

It will be understood that these exemplary embodiments in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and broad scope of the appended claims are covered.

We claim:

1. A tape guide module for guiding a tape longitudinally through a read/write zone on a tape cartridge, comprising:

first and second tape surface pieces having top and bottom edges and longitudinal axes along respective tape bearing surfaces on the first and second tape surface pieces;

attaching means along the top and bottom edges of the first and second tape surface pieces;

a top plate having a plurality of receiving means for engagement with the attaching means on the top edges of the first and second tape pieces, the receiving means retaining each of the first and second tape surface pieces on first and second opposite sides of the read/write zone in a configuration which is convex along their longitudinal axes and straight perpendicular to their longitudinal axes;

a bottom plate having a plurality of receiving means for engagement with the attaching means on the bottom edges of the first and second tape pieces, the receiving means retaining the first and second surface pieces on the first and second sides of the read/write zone in a configuration which is convex along their longitudinal axes and straight perpendicular to their longitudinal axes, the first and second tape surface pieces separating a first portion of the top and bottom plates by a fixed distance;

support means for separating a second portion of the top and bottom plates which is slightly spaced from the first portion at a distance slightly less than the fixed distance so that the first and second tape surface pieces are retained between the top and bottom plates; and mounting means for securing the tape guide module to the tape cartridge.

2. The tape guide module of claim 1 wherein the support means comprises at least two post structures located proximate the first and second tape surface pieces, respectively.

3. The tape guide module of claim 2 wherein the at least two post structures mount the tape guide module to the tape cartridge, and wherein the at least two post structures includes a larger diameter central portion which is disposed between the top and bottom plates and smaller diameter end portions at each end of the central portion which extend through openings in the respective top and bottom plates.

4. The tape guide module of claim 1 wherein the support means comprises a post structure having a radius of curvature which is less than the curvature of the tape bearing surfaces along their longitudinal axes.

5. The tape guide module of claim 1 wherein a portion of the top plate forms a flange bordering the tape bearing surface for aligning the tape relative to the reels.

6. The tape guide module of claim 1 wherein the receiving means comprise slots in the top and bottom plates arranged to define a first radius of curvature, the first and second tape surface pieces each having a radius of curvature greater than the first radius of curvature so that the tape surface pieces are biased against receiving slot bearing surfaces.

7. The tape guide module of claim 1 wherein the tape bearing surfaces are convex along an axis perpendicular to the longitudinal axes.

8. The tape guide module of claim 1 wherein the mounting means includes a guide spacer between the bottom plate and the tape cartridge.

9. The tape guide module of claim 1 wherein the tape surface pieces are formed using a calendering roller.

10. The tape guide module of claim 9 wherein the calendering roller is slightly convex.

11. The tape guide module of claim 1 wherein the mounting means includes biasing means between the tape cartridge and the bottom plate for biasing the bottom plate toward the top plate.

12. The tape guide module of claim 11 wherein the biasing means comprises a spring.

13. The tape guide module of claim 1 wherein the attaching means comprise tabs on the top and bottom edges of the first and second tape surface pieces.

14. The tape guide module of claim 13 wherein the tabs extend through the bottom plate to support the tape guide module in the tape cartridge.

15. The tape guide module of claim 1 wherein the tape surface pieces are constructed of a semi-rigid elastic material.

16. The tape guide module of claim 1 wherein the tape surface pieces are constructed of metal.

17. A tape guide module for guiding a tape to and from respective tape reels longitudinally through a read/write zone proximate first and second sides of a cut-away portion on a cartridge base plate, the tape guide module comprising:

first and second tape surface pieces having top and bottom edges and longitudinal axes along respective tape bearing surfaces;

a plurality of tabs on the top and bottom edges of the first and second tape surface pieces extending generally perpendicular from the longitudinal axes;

a top plate shaped to extend proximate to at least a portion of the first and second sides of the cut-away portion, the top plate having a plurality of tab receiving slots retaining the tabs on the top edges of the first and second tape surface pieces proximate the first and second sides of the cut-away portion, respectively, in a generally convex configuration;

a bottom plate shaped to extend proximate to at least a portion of the first and second sides of the cut-away portion, the bottom plate having a plurality of tab receiving slots retaining the tabs on the bottom edges of the first and second tape surface pieces proximate the first and second sides of the cut-away portion, respectively, in a convex configuration, the first and second tape surface pieces separating a first portion of the top and bottom plates by a fixed distance;

at least one post structure maintaining the separation between a second portion of the top and bottom plates slightly spaced from the first portion at a distance slightly less than the fixed distance so that the first and second tape surface pieces are retained between the top and bottom plates; and mounting means for securing the tape guide module to the base plate proximate the cut-away portion.

18. A tape cartridge comprising:

a pair of tape reels rotatably mounted on a base plate;

magnetic tape wound on the tape reels;

a tape guide module for guiding the tape to and from the respective tape reels longitudinally through a read/write zone proximate first and second sides of a cut-away portion on the base plate, the tape guide module comprising:

first and second tape surface pieces having top and bottom edges and longitudinal axes along respective tape bearing surfaces;

a plurality of tabs on the top and bottom edges of the first and second tape surface pieces extending generally perpendicular from the longitudinal axes;

a top plate shaped to extend proximate to at least a portion of the first and second sides of the cut-away portion, the top plate having a plurality of tab receiving slots retaining the tabs on the top edges of the first and second tape surface pieces proximate the first and second sides of the cut-away portion, respectively, in a convex configuration;

a bottom plate shaped to extend proximate to at least a portion of the first and second sides of the cut-away portion, the bottom plate having a plurality of tab receiving slots retaining the tabs on the bottom edges of the first and second tape surface pieces proximate the first and second sides of the cut-away portion, respectively, in a convex configuration, the first and second tape surface pieces separating a first portion of the top and bottom plates by a fixed distance;

at least one post structure maintaining the separation between a second portion of the top and bottom plates slightly spaced from the first portion at a distance slightly less than the fixed distance so that the first and second tape surface pieces are retained between the top and bottom plates; and mounting means for securing the tape guide module to the base plate proximate the cut-away portion.

* * * * *